United States Patent
Eggers et al.

(10) Patent No.: US 8,554,936 B2
(45) Date of Patent: Oct. 8, 2013

(54) REDISTRIBUTION OF OPERATING ENVIRONMENTS FOR THE REDEPLOYMENT OF GRID CLIENTS

(75) Inventors: Robert J Eggers, Austin, TX (US); Darren C Douglas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2162 days.

(21) Appl. No.: 11/111,028

(22) Filed: Apr. 21, 2005

(65) Prior Publication Data

US 2006/0242228 A1    Oct. 26, 2006

(51) Int. Cl.
G06F 15/16 (2006.01)
G06F 15/177 (2006.01)
G06F 9/00 (2006.01)
G06F 9/24 (2006.01)

(52) U.S. Cl.
USPC ........... 709/230; 709/203; 709/220; 709/221; 709/222; 713/1; 713/2

(58) Field of Classification Search
USPC .......................... 709/220–222; 713/1–2, 100
See application file for complete search history.

(56) References Cited

U.S. PATENT DOCUMENTS

| 5,860,001 | A | 1/1999 | Cromer et al. |
|---|---|---|---|
| 2003/0037229 | A1 | 2/2003 | Baron |
| 2003/0055928 | A1 | 3/2003 | Machida |
| 2003/0070063 | A1* | 4/2003 | Boyle et al. ........................ 713/2 |
| 2003/0074549 | A1* | 4/2003 | Paul et al. ......................... 713/2 |
| 2003/0208579 | A1* | 11/2003 | Brady et al. .................. 709/223 |

OTHER PUBLICATIONS

Savnio et al., Impact of Client/Server on the Telecommuncations Industry, 8/1, Aug. 18-19, 1996, Managing Virtual Enterprises, p. 605.*

"Resume from Hibernate or Standby in Seconds", Mar. 20, 2001, Microsoft Corporation.*

* cited by examiner

*Primary Examiner* — Glenton B Burgess
*Assistant Examiner* — Angela Nguyen
(74) *Attorney, Agent, or Firm* — Dan Shifrin

(57) ABSTRACT

A client-server network environment is temporarily transformed into a grid computing environment through the deployment of a network-booted grid operating system to each of a plurality of network clients. Each participating client operates in the client-server mode under a local operating system. At an appropriate time, a server transmits to each client a thin-client boot image (a dynamically built customized image or an image obtained from a store of predefined boot images) along with a grid application for which the thin-client has been optimized for peak performance. Each client re-boots using the thin-client image, thereby entering the grid mode and allowing substantially all of its computing resources to be dedicated to executing the grid application. At a later time, the server directs that each client terminate the grid application and re-boot in its respective local operating system, reverting again to the client-server mode.

16 Claims, 5 Drawing Sheets

US 8,554,936 B2

REDISTRIBUTION OF OPERATING ENVIRONMENTS FOR THE REDEPLOYMENT OF GRID CLIENTS

TECHNICAL FIELD

The present invention relates generally to the temporary transformation of a conventional client-server environment into a grid computing environment and, more particularly, to the deployment of a network-booted grid operating system to each of a plurality of network clients.

BACKGROUND ART

One path in the evolution of computer networks is the concept of "grid computing" in which computing resources are pooled or shared for the purpose of running a particular application (or set of applications). Thus, large amounts of computing resources are available to work collaboratively on a processing-intensive problem. For example, in a project for the Search for Extra-Terrestrial Intelligence (SETI), thousands of people have "donated" the idle time of their personal computers. Radio signals are gathered by radio telescopes and provided to the on-line computers through the internet. The computers process the data and return results back to a SETI server in an attempt to identify artificially generated radio signals from space.

Businesses also use grids for more practical purposes, such as in aircraft design or genetic research. Rather than purchase a supercomputer (or lease time on such a computer), a company may find it more economical to establish a grid of less expensive and, individually less powerful, computers. One grid configuration may comprise an array of high availability, enterprise-class computers. However, such a system will typically be cost prohibitive for all but the largest businesses. Another grid configuration may comprise a networked array of personal computer (PC) clients which execute grid applications while the PC's are also being used by the end user. A significant disadvantage of such a configuration is that, for critical grid processing tasks, the overhead associated with sharing resources on a PC client that is already in use severely impacts processing performance, both for the end user and for the grid application.

Consequently, a need remains for a grid configuration which is cost efficient for small and medium sized users.

SUMMARY OF THE INVENTION

The present invention computer network having a client-server mode and a grid mode through the deployment of a network-booted grid operating system to each of a plurality of network clients. Each participating client operates in the client-server mode under a local operating system. At an appropriate time, a server transmits to each client a thin-client boot image (a dynamically built customized image or an image obtained from a store of predefined boot images) along with a grid application for which the thin-client has been optimized for peak performance. Each client re-boots using the thin-client image, thereby entering the grid mode and allowing substantially all of its computing resources to be dedicated to executing the grid application. At a later time, the server directs that each client terminate the grid application and re-boot in its respective local operating system, reverting again to the client-server mode.

The present invention further provides a method for temporarily transforming a client-server network into a grid network. The present invention further provides a method for deploying a network booted operating system on each of a plurality of networked clients. Still further, the present invention provides a server operable to direct clients to initiate a network boot in a thin-client mode, transmit thin-client images to the clients, launch a grid application on each client and direct that each client re-boot into its respective local operating system.

The present invention further provides a method for reducing idle computing resources on a network. Still further, the present invention provides a computer program product having computer-readable code embodied therein for temporarily transforming a client-server network into a grid network. The present invention also provides a method for deploying computing infrastructure comprising integrating computer readable code into a computing system, wherein the code, in combination with the computing system, is capable of allowing each client to operate in a client-server mode, configuring a server to become a master node, directing that the clients initiate a network boot in a thin-client mode and become processing nodes, transmitting a thin-client image and a grid application to each processing node, launching the grid application on each processing node and directing that each processing node re-boot into its respective local operating system.

DETAILED DESCRIPTION OF THE PREFERRED EMBODIMENT

Figure 1:
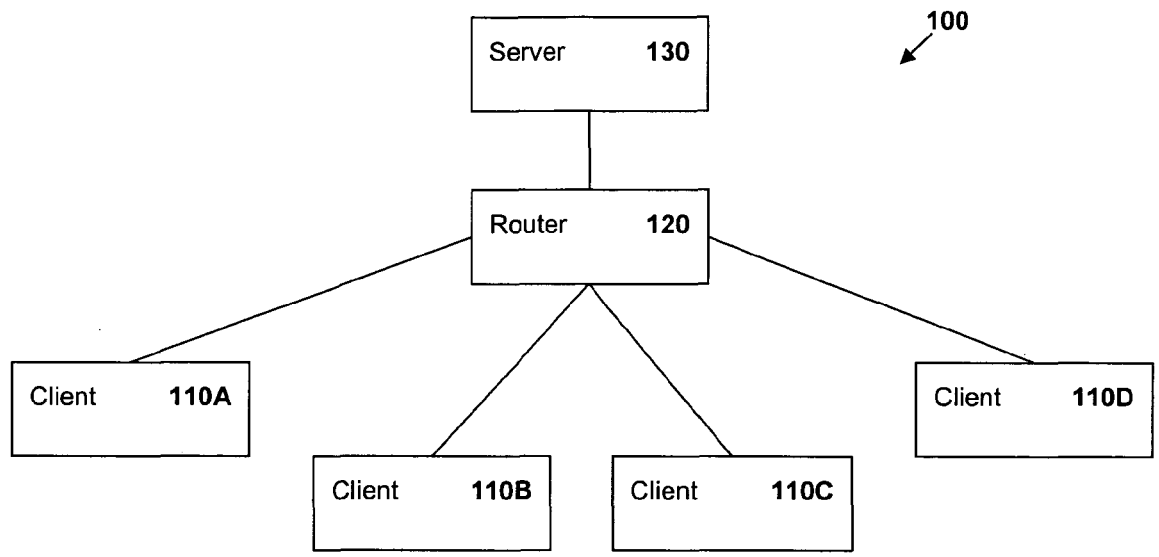
FIG. 1 is a block diagram of a network of the present invention in a client-server mode.

FIG. 1 is a block diagram of a network 100 of the present invention in a client-server mode. A plurality of client devices 110A, 110B, 110C and 110D (collectively referred to herein as 110) are coupled, such as through a router 120 or other similar networking device to a server 130. The invention may also be implemented with other types of networks, including the internet.

Figure 2:
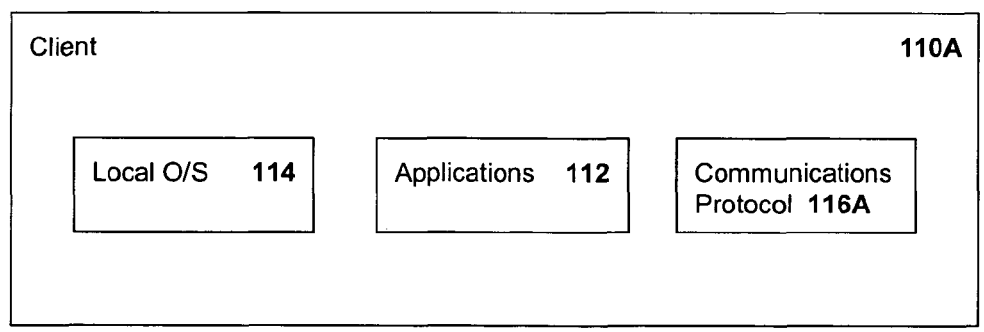
FIG. 2 is a block diagram of a client device of the present invention operating in the client-server mode.

FIG. 2 is a block diagram of one of the client devices 110A (representative of all client devices 110) of the present invention operating in the client-server mode of FIG. 1. In the client-server mode, the client device 110A executes software applications 112 under a local operating system 114. For example, the client device 110A may be a conventional desktop or notebook personal computer (PC) operating under a Microsoft® Windows® operating system although other types of computers, such as workstations, and other operating systems, such as Linux®, may be used. The client 110A also includes one of a variety of possible communications protocols 116 to enable the client 110A and the server 130 to communicate with each other and exchange data in various forms. Additionally, the client 110A preferably also includes a protocol or routine, such as the Intel® boot agent (also known as a pre-execution environment or PXE) to allow the client 110A to boot from a network-supplied boot image, such as the thin-client image 512.

Figure 3:
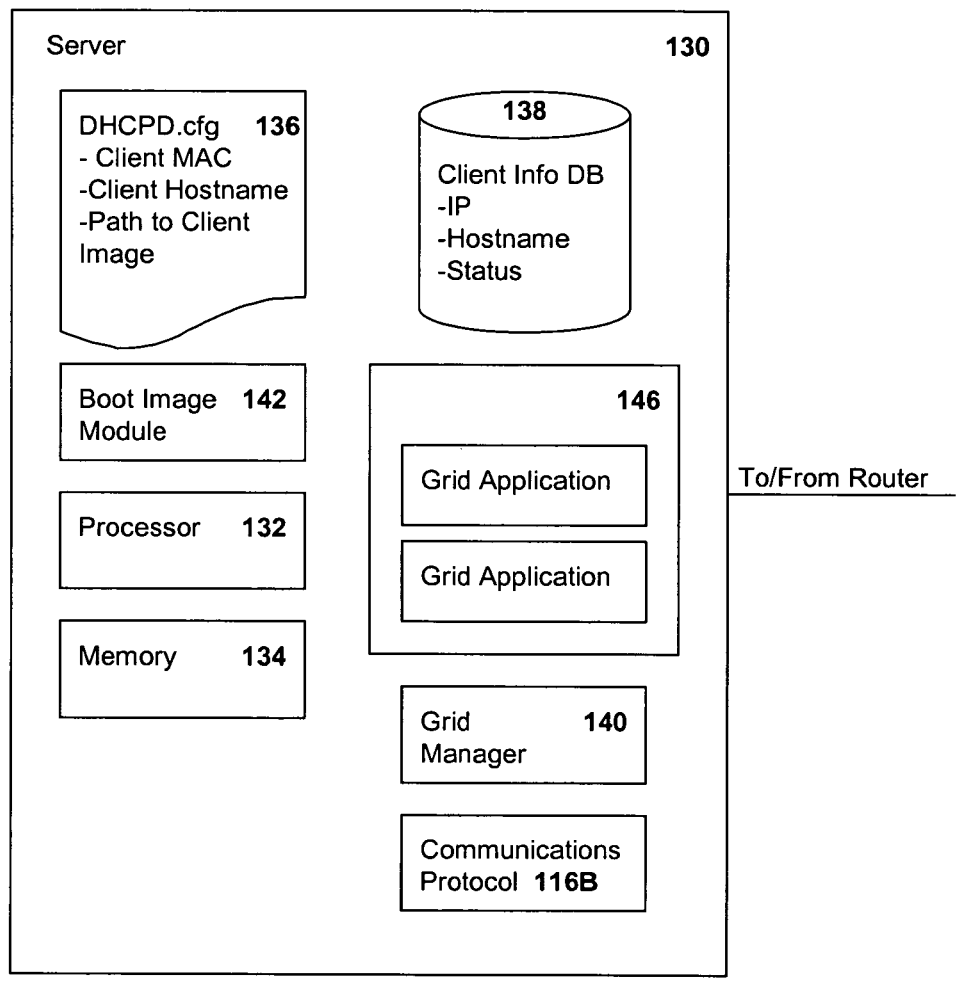
FIG. 3 is a block diagram of a server of the present invention.

The server 130 is illustrated in the block diagram of FIG. 3 and includes a processor 132 and a memory 134 for storing instructions executable by the processor 132. For clarity, the memory 134 is illustrated as a single element. However, the actual memory 134 used in the server may include RAM, ROM, flash, magnetic, optical or any combination of these or other forms of memory. In the embodiment illustrated, the server 130 is a dynamic host configuration protocol (DHCP) server. In such a configuration, the server 130 further includes a DHCPD configuration file 136 and a client information database 138, either or both of which may reside in the memory 134. A grid manager 140 comprises a set of instructions executable by the processor 132 for managing the operation of the network 100 in a grid mode. A boot image module 142 also comprises a set of instructions executable by the processor 132 for, in one embodiment, generating a boot image or, in a second embodiment, storing predetermined boot images. Both the grid manager 140 and the boot image module 142 may reside in the memory 134 along with one or more grid applications 146. A communications protocol 116B allows the exchange of data with a client 110A through the communications protocol 116A residing in the client 110A. The server 130 may run under any suitable operating system which allows the server 130 to deploy the thin-client image 512 to the clients 110. Red Hat Linux 9 is one such operating system and permits client usage and grid processing status to be monitored.

Figure 4:
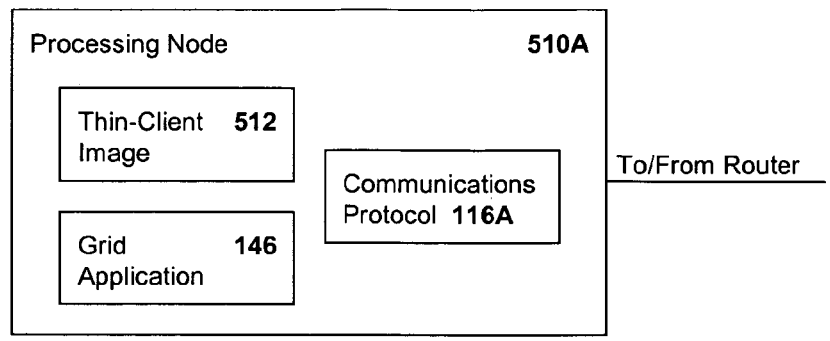
FIG. 4 is a block diagram of a client device of the present invention operating in the grid mode.
Figure 5:
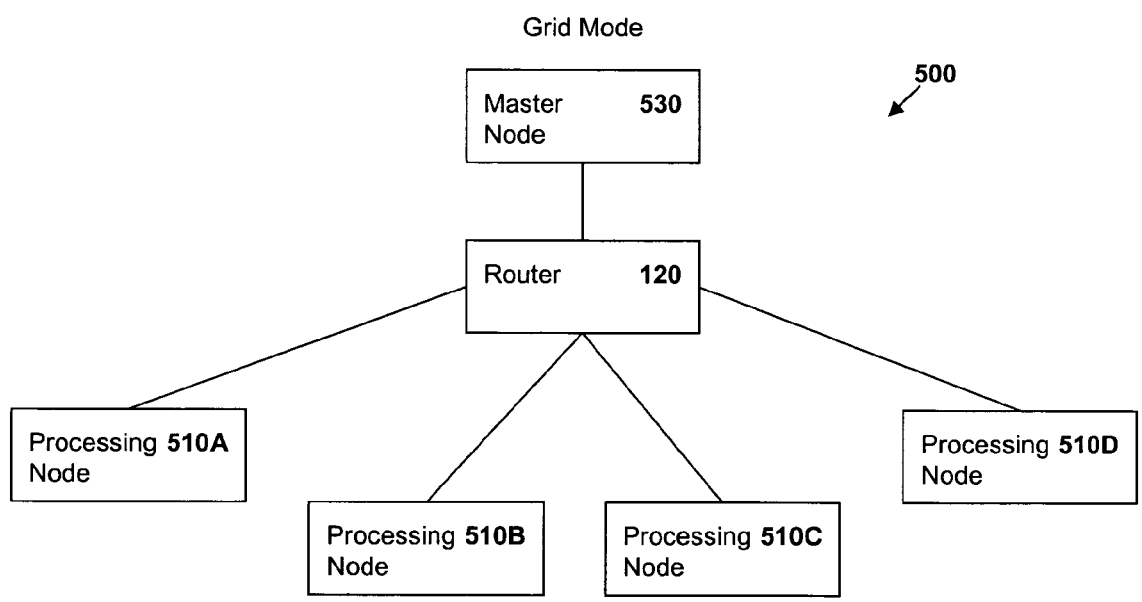
FIG. 5 is a block diagram of a network of the present invention in a grid mode.

In operation, the server 130 transmits to each available client 110 a thin-client image 512 from the boot image module 142 and a grid application 146. Using the thin-client image 512, each client 110 re-boots in a grid mode and launches the grid application 146 (FIG. 4). The thin-client image 412 may be, for example, PXES Linux Thin Client and includes only enough operating system for the client 110 to run the grid application 146 without the memory and processor resources of the client being used for unnecessary overhead processes such as managing unused, peripheral drivers, idle applications, and desktop environments. Moreover, a thin-client such as PXES allows a user at the server 130 to customize the features which the client 110 will use. FIG. 5 illustrates the network in the grid mode 500. The server 130 operates now as a master node 530 and is able to acquire the use of substantially all of the computing resources (memory and processor) of each client 110, which are now considered to be processing nodes 510 on the grid 500. At some later time, the master node 530 directs that the processing nodes 510 terminate current grid operations and re-boot either in a new grid image with a different grid application or in their respective local operating systems 114, whereupon the grid mode 500 reverts to the client-server mode 100 (FIGS. 1 and 2) and all prior client applications and data will be restored to the state in which the user left them.

The operating system image is used to provide a minimal base environment on top of which the grid application runs and can be highly customized to provide only the necessary applications for supporting the needs of the various grid applications. Since the network booted operating system is typically run out of the client's system memory from what is called a "RAM disk", removing any operating system features and applications from the image provides more RAM disk capacity for the operation of the grid task. Moreover, as the total image decreases in size, the tasks required to generate the image dynamically and boot it over a network will take less time to complete. For example, while transferring a single image of 5 MB may take only a matter of seconds, transferring a 5 MB image to each of potentially tens of thousands of nodes could take considerably longer as the server system and the network increasingly become a bottle neck. If the image can instead be reduced from 5 MB to 3.5 MB, a deployment speed gain may be attained which is proportional to the decrease in the image size. Benefits of using a thin-client environment and tools such as those provided by the PXES project include the flexibility and speed of piecing together the grid operating environment on-the-fly using simple parameters such as system type and application prerequisites to describe the scenario for deployment. The server would need to contain at least two sets or tables of information mapping the host type to a list of required drivers needed to boot a very basic network enabled operating system, as well as a second set or table of information describing the package prerequisites needed to support the grid application.

In one embodiment of the transformation from the client-server mode to the grid mode, the clients 110 are re-booted with the thin-client image in the grid mode at a predetermined time when the clients 110 are not likely to be used in the usual course of their operations. For example, the transformation to the grid mode may be initiated after normal business hours, after the day-to-day activities of the clients 110 has substantially ceased. Subseqently, the processing nodes 510 may then be re-booted into their local operating systems in the client-server mode before normal business hours resume. Thus, the present invention reduces idle resources in the environment 100 by using clients 110 at a time during which they might not otherwise be utilized.

Figure 6A:
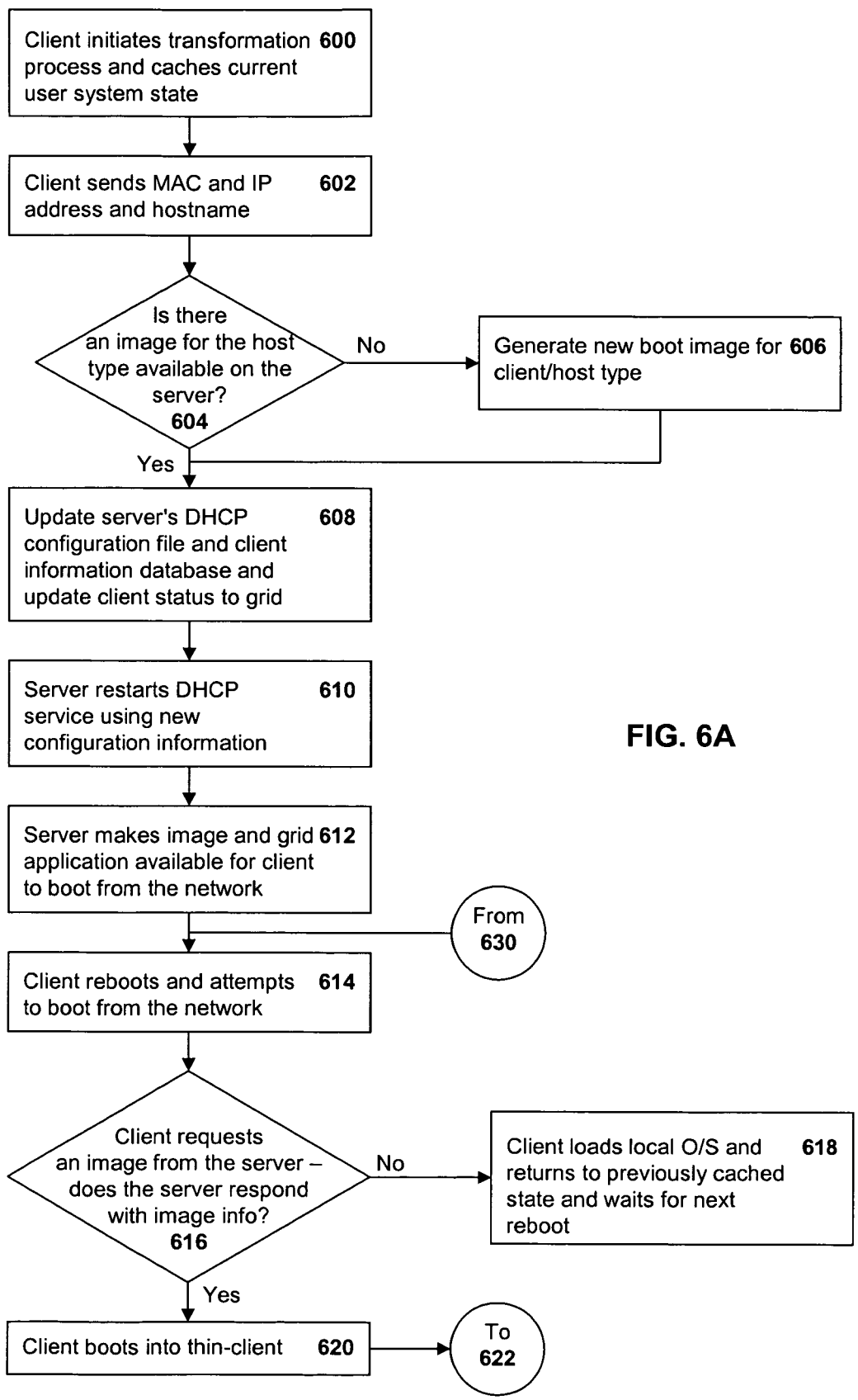
FIGS. 6A and 6B are a flowchart of a method of the present invention.
Figure 6B:
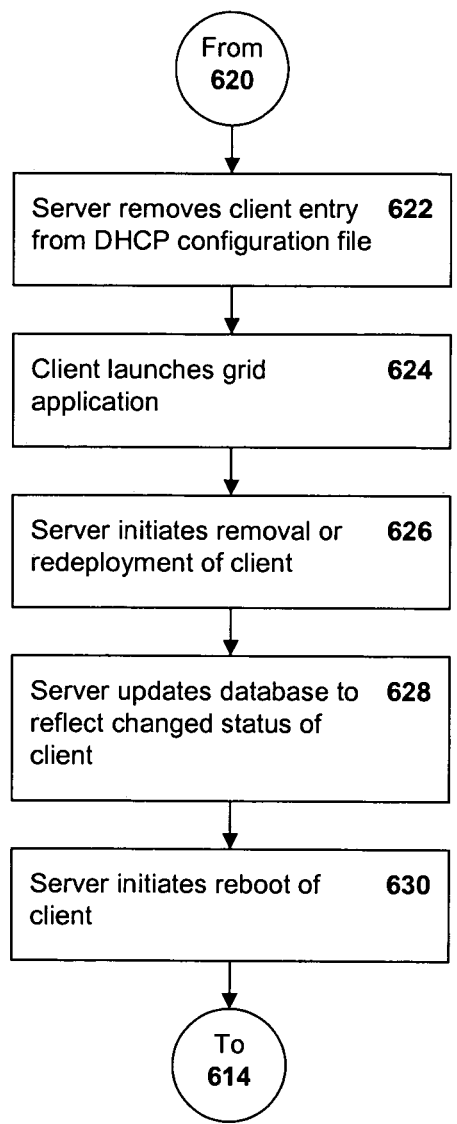

A method of the present invention will now be described with reference to the flowchart of FIGS. 6A and 6B. Upon the occurrence of a predefined event, a client 110 may initiate the transformation process (step 600). Such an event may include, but not be limited to, reaching a particular time of day (such as after normal business hours) or the client 110 being idle for a predetermined period of time. Alternatively, the transformation to the grid mode may be initiated by the server 130, such as at a particular time of day or by sending out periodic inquiries to the clients 110 to determine if any have been idle for a predetermined period of time. If enough clients 110 are idle to provide desired grid resources, the transformation process may be initiated.

A participating client 110A transmits its media access control (MAC) address to the server 130, along with its current IP address and hostname (step 602). Based on this identification information, the server 130 determines from the client information database 138 if a thin-client or boot image 512 for the host type of the particular client 110A is already stored in the DHCP configuration file 136 on the server 130 (step 604). If not, the boot image module 142 of the sever 130 generates an image 512 for the client 110A (step 606). Alternatively, the server 130 may not store any predefined images but generate a new image 512 for each client 110 at the beginning of each transformation process, thereby omitting the determination step 604. The server 130 next updates the DHCP configuration file 136 with the MAC address, hostname and image (if the latter has changed and requires an update) of the client 110A and the client information database 138 with the IP address and hostname of the client 110A (step 608). The status of the client 110A is also updated in the client information database 138 by changing the status from "client" to "grid".

The server 130 reinitializes the DHCP service (step 610) in order to commit the configuration updates and makes the image 512 available to the client 110A via the TFTP protocol as required by the PXE boot protocol (step 612). With both the server 130 and the client 110A prepared for the boot process, the server 130 initiates a reboot of the client 110A (step 630). The client 110A will have been configured to attempt booting first from its network device (step 614) and then from local devices if the network boot is not successful and times out. If during the client 110A boot process the server 130 does not fulfill the client 110A network boot request (step 616), the client's 110A network boot process times out and the client 110A continues to the next device in the boot order and loads its local operating system 114, returns to its previously cached state and waits for a next re-boot (step 618). If the client 110A is made aware of an available image 512 by the server 130 defined for the DHCP service 136 the client 110A will proceed to boot the image provided by the server 130 (step 620). The server 130 may then remove the client entry from the DHCP configuration file 136 (step 622) in order to maintain a clean DHCP configuration. The client 110A, using the communications protocol 116 or other type of startup script launches the grid application 146 (step 624) and the client begins functioning as a grid processing node 510A.

Preferably, the thin-client image 512 transmitted to each client 110 is dynamically built or generated image and customized for the particular hardware and operating system configuration of each client 110. Thus, a variety of different types of computers, running under a variety of different operating systems, may be included the grid environment 500. Moreover, because a thin-client image 512 is preferably individually transmitted to a client 110A rather than being broadcast to all clients 110, different grid applications 146 may be transmitted to different clients 110 allowing different processing nodes 510 to work on different computing problems simultaneously.

At a later predetermined time, such as before normal business hours resume or upon completion of a computing project, the master node 530 initiates the removal of the processing node 510A from the grid environment 500 (step 626) and updates the client information database 138 to reflect the changed status of the processing node 510A (step 628). The master node 530 then initiates a re-boot of the processing node 510A (step 630) and the routine returns to step 616 at which time the client 110A again attempts to boot from the network and times out if the server 130 does not provide an image and proceeds to the next available boot device defined in the client 130 boot order sequence.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer storage readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing global metadata or a method for deploying computing infrastructure comprising integrating computer readable code into a computing system for managing global metadata.

What is claimed is:

1. A computer network having a client-server mode and a grid mode, comprising:
  a plurality of client devices, each operating under a respective local operating system in the client-server mode and each comprising:
    a memory for storing computer-executable instructions;
    a processor for executing instructions stored in the memory;
    a communications protocol stored in the memory; and
    boot instructions stored in the memory directing the client device to attempt to boot first from the network and from a local device if the network boot is not successful;
  a server device to which the client devices are coupled, the server operable to:
    direct that each client device initiate a boot at a first predetermined time, whereupon each client device attempts to perform a network boot;
    upon a successful network boot by each client device, transmit a thin-client image and a grid application to each client device, whereupon each network device boots the thin-client image;
    direct that each client device launch the grid application, whereby each client device operates in a grid mode with substantially all resources of the processor and memory of each client device being available for use by the grid application; and
    at a second predetermined time, direct that each client device attempt a re-boot without providing a thin-client image, whereupon a network boot fails and each client-device boots from a local device into its respective local operating system, whereby the client devices operate in a client-server mode.

2. The computer network of claim 1, wherein the plurality of client devices comprise personal computers.

3. The computer network of claim 1, wherein the thin-client mode comprises a Linux thin-client operating system mode.

4. The computer network of claim 1, wherein the server is further operable to launch different grid applications on different client devices.

5. The computer network of claim 1, wherein the server is further operable to generate a dynamically built customized thin-client image for each of the client devices.

6. The computer network of claim 1, wherein the server is further operable to:
  store at least one predefined thin-client image; and
  transmit a selected one of the predefined thin-client images to each client device.

7. The computer network of claim 1, wherein:
  each client is operable to transmit to the server the MAC address, the current IP address and the hostname of the client;
  the server is further operable to receive from each client the MAC address, the current IP address, and the hostname of the client; and
  the server further comprises:
    a configuration file for storing the MAC address, the hostname and the thin-client image for each client;
    a client information database for storing the current IP address, the hostname, the client system type, and an updated status of each client, the status selected from the group comprising client mode and grid mode.

8. A method for deploying a network booted operating system on each of a plurality of networked clients, comprising:
- at a first predetermined time, receiving in a DHCP server from a sending client a client MAC address, a current client IP address, and a hostname;
- determining whether a boot image is available for deployment to the sending client;
- after determining that a boot image is not available for the sending client, generating a boot image for the sending client;
- updating a server DHCP configuration file with the MAC address, the hostname, and the boot image;
- updating a server client database with the IP address, the hostname, and an updated client status;
- restarting DHCP service to the sending client using the updated configuration and database information;
- directing that the client cache its current state including active applications and user data for restoration at the conclusion of grid deployment;
- transmitting the thin-client image and a grid application from the DHCP server to the sending client;
- directing that the sending client re-boot as a grid processing node with the thin-client image received from the DHCP server;
- removing the sending client entry from the DHCP server configuration file;
- launching in the sending client the grid application received from the DHCP server to the sending client;
- at a second, later predetermined time, removing the sending client from the grid;
- updating the client database with a newly updated client status;
- initiating a re-boot of the sending client;
- determining whether a boot image is available in the DHCP server to the sending client;
- after determining that a boot image is no longer available to the sending client, proceeding to attempt to boot the sending client from a next device in a boot order; and
- after the sending client is booted, restoring the sending client to a state in which a user left the system using previously cached state information.

9. A computer program product of a computer readable storage medium usable with a programmable computer, the computer program product having computer-readable code embodied therein for temporarily transforming a client-server network into a grid network, the computer-readable code comprising instructions for:
- allowing each of a plurality of client devices to operate under a local operating system in a client-server mode;
- at a first predetermined time, configuring a server, with which the client devices are coupled through a network, to operate under a thin-client operating system, whereby the server becomes a master node on the network;
- for each client device:
    - determining whether a boot image is available for deployment to the client device;
    - after determining that a boot image is not available for the client device, generating a boot image for the client device;
    - directing that the client device initiate a network boot in a thin-client mode, whereby the client device becomes a processing node for the server;
    - transmitting a thin-client image and a grid application to the processing node, whereupon the client device boots the thin-client image; and
    - launching the grid application on the processing node, whereby the processing operates in a grid mode with substantially all resources of the server and memory of the processing node being available for use by the grid application; and
- at a second, later predetermined time, directing that each processing node re-boot into its respective local operating system.

10. The computer program product of claim 9, wherein the instructions further comprise generating a dynamically built customized thin-client image for each of the client devices.

11. The computer program product of claim 9, wherein:
- the computer program product further comprises instructions for storing at least one predefined thin-client image in the server; and
- the instructions for transmitting comprise instructions for transmitting a selected one of the predefined thin-client images to each client device.

12. The computer program product of claim 9, wherein the instructions for launching a grid application comprise instructions for launching different grid applications on different processing nodes.

13. A method for deploying computing infrastructure, comprising integrating computer readable code into a computing system, wherein the code, in combination with the computing system, is capable of performing the following:
- allowing each of a plurality of client devices to operate under a local operating system in a client-server mode;
- at a first predetermined time, configuring a server, with which the client devices are coupled through a network, to operate under a thin-client operating system, whereby the server becomes a master node on the network;
- for each client device:
    - determining whether a boot image is available for deployment to the client device;
    - after determining that a boot image is not available for the client device, generating a boot image for the client device;
    - directing that the client device initiate a network boot in a thin-client mode, whereby the client device becomes a processing node for the server;
    - transmitting a thin-client image and a grid application to the processing node, whereupon the client device boots the thin-client image;
    - launching the grid application on the processing node, whereby the processing operates in a grid mode with substantially all resources of the server and memory of the processing node being available for use by the grid application; and
- at a second, later predetermined time, directing that each processing node re-boot into its respective local operating system.

14. The method of claim 13, wherein transmitting a thin-client image comprises transmitting a dynamically built customized thin-client image for each client.

15. The method of claim 13, wherein transmitting a thin-client image comprises transmitting to each client a selected one of a plurality of predefined thin-client images.

16. The method of claim 13, wherein launching a grid application comprises launching different grid applications on different processing nodes.

* * * * *